United States Patent [19]
Hehl

[11] Patent Number: 5,095,971
[45] Date of Patent: Mar. 17, 1992

[54] APPARATUS FOR WATER-COOLING OIL USED IN A HYDRAULIC SYSTEM FOR ACTUATING AN INJECTION MOLDING MACHINE

[76] Inventor: Karl Hehl, Arthur-Hehl-Str. 32, D-298 Lossurg 1, Fed. Rep. of Germany

[21] Appl. No.: 649,007

[22] Filed: Jan. 25, 1991

[30] Foreign Application Priority Data

Jan. 31, 1990 [DE] Fed. Rep. of Germany ....... 4002739

[51] Int. Cl.$^5$ .......................... F28D 7/02; F28F 19/00; F28F 9/22; F28F 1/42
[52] U.S. Cl. ...................... 165/47; 165/119; 165/137; 165/160; 165/163; 184/104.1; 137/561 A; 210/168; 210/186; 210/323.1
[58] Field of Search ............ 165/119, 47, 51, 137, 165/160, 163; 123/196 AB, 41.33; 137/561 A; 184/104.1, 6.22, 104.3; 210/168, 186, 323.1, 340

[56] References Cited

U.S. PATENT DOCUMENTS

| | | | |
|---|---|---|---|
| 2,063,782 | 12/1936 | Barnes | 184/104.3 |
| 2,218,226 | 10/1940 | Williams | 210/168 |
| 2,473,032 | 6/1949 | Le Clain | 210/340 |
| 3,295,685 | 1/1967 | Young | 210/340 |
| 3,598,243 | 8/1971 | Gutkowski | 210/340 |
| 4,192,750 | 3/1980 | Elfes et al. | 210/340 |
| 4,246,115 | 1/1981 | Swank | 210/168 |
| 4,331,535 | 5/1982 | Pett | 210/323.2 |
| 4,424,778 | 1/1984 | Yoshida | 123/196 AB |
| 4,615,800 | 10/1986 | Stifelman et al. | 210/340 |
| 4,669,533 | 6/1987 | Hehl | 165/119 |

Primary Examiner—John Ford
Attorney, Agent, or Firm—Spencer & Frank

[57] ABSTRACT

For selectively satisfying a basic cooling demand or a cooling demand which is an integral multiple of said basic cooling demand, the apparatus can be assembled from components selected from a plurality of sets of such components. For satisfying the basic cooling demand the apparatus comprises a single cooler-filter unit. One set of components consists of a plurality of said cooler-filter units. Another set of components consists of mounting blocks, which are to be mounted in a reservoir and adapted to communicate with cooler-filter units provided on the outside of a wall defining said reservoir. Another set consists of manifold blocks, each of which is adapted to be connected between the port members of cooler-filter units and a mounting block and to which each cooler-filter unit is hydraulically connected by means of a transverse supply passage section and a transverse return passage section. Such an apparatus can be arranged to satisfy a given cooling demand by the provision of one or more cooler-filter units connected to the reservoir and this will not appreciably increase the manufacturing costs.

12 Claims, 3 Drawing Sheets

APPARATUS FOR WATER-COOLING OIL USED IN A HYDRAULIC SYSTEM FOR ACTUATING AN INJECTION MOLDING MACHINE

BACKGROUND OF THE INVENTION

1. Field of the Invention

This invention relates to an apparatus for water-cooling oil used in a hydraulic system for actuating an injection molding machine and for purifying said oil by filtration, which apparatus comprises two coaxial oil-conducting pipes, at least one cooling pipe extending in a first annular space between the oil-conducting pipes, a filter cartridge, which is surrounded by the inner oil-conducting pipe and defines with the inner oil-conducting pipe a second annular space for receiving oil to be filtered, which comes from the first annular space, and mounting means for securing the apparatus to a wall which defines an oil reservoir of the injection molding machine, which mounting means comprise a port member, which is mounted on the outer oil-conducting pipe and has a centering outer end portion, and a mounting block, which is disposed in the reservoir, wherein the port member and the mounting block contain each two passage sections, which are respectively coaxially included in a supply passage and a return passage for the oil.

2. Description of the Prior Art

In the operation of injection molding machines there is a widely varying demand for cooling the oil used in the hydraulic actuating means because that cooling demand will depend not only on the size of the injection molding machine but also on its mode of operation and on the physical properties of the material which is processed and also on the temperature of the ambient atmosphere. A decisive role is also played by the often varying temperature of the incoming temperature-control fluid or of the cooling water. In a tropical region the latter temperature in a room which is not air-conditioned may be higher by 20° to 30° C. than in countries having a rough climate in a room which is not heated or only slightly heated. A known apparatus of the kind described first hereinbefore has been disclosed in U.S. Pat. No. 4,669,533 and for the above-mentioned reasons must be designed for the maximum cooling demand, i.e., for a relatively high surplus cooling capacity. Because the cooling capacity will also depend on the size of the cooling apparatus, the latter will occupy a relatively large space on the outside surface of the base structure of the injection molding machine, particularly in that embodiment which has been described in lines 10 to 17 of column 9 of U.S. Pat. No. 4,669,533.

SUMMARY OF THE INVENTION

It is an object of the invention so to improve an apparatus which is of the kind described first hereinbefore that it can be manufactured at low cost and has a smaller space requirement and that it can be adapted much more closely to varying cooling demands.

That object is accomplished in accordance with the invention in that the apparatus consists of a plurality of components, which are adapted to be selected from sets of such components for use in a basic assembly for satisfying a basic cooling demand and for use in first and second larger assemblies for satisfying a cooling demand which is twice and three times, respectively, said basic cooling demand, wherein said sets of modules comprise
  a) a set of cooler-filter units, each of which is provided with a port member and has a size which is suitable for use in said basic assembly,
  b) a set of mounting blocks,
  c) a set of manifold blocks, each of which is adapted to connect said port member of one of said cooler-filter units to one of said mounting blocks and for connecting said supply and return passage sections of said port members to said supply and return passage sections of said mounting block by means of a transverse supply passage section and a transverse return passage section.

Owing to that arrangement the cooling demand can be satisfied in each case in that the cooling capacity provided by one cooler-filter unit can be multiplied and this will not appreciably increase the manufacturing costs. When the total cooling demand is approximately an integral multiple of the basic cooling demand, cooler-filter units in the required number can be assembled by means of the one or more manifold blocks to provide a hydraulic unit so that it is possible to manufacture and to keep in stock a set of identical cooler-filter units for satisfying the basic cooling demand, a set of manifold blocks and a set of mounting blocks.

An important advantage afforded by the invention resides in that when the apparatus has been installed, e.g., at a remote location, which is not accessible or is not conveniently accessible for a regular servicing, the apparatus can be adapted even by only slightly trained staff to different cooling requirements which had initially not been recognized. Because the flat manifold blocks are light in weight and occupy only a small space, they may even be sent by mail to the location at which they are to be used.

DETAILED DESCRIPTION OF THE PREFERRED EMBODIMENTS

Figure 1:
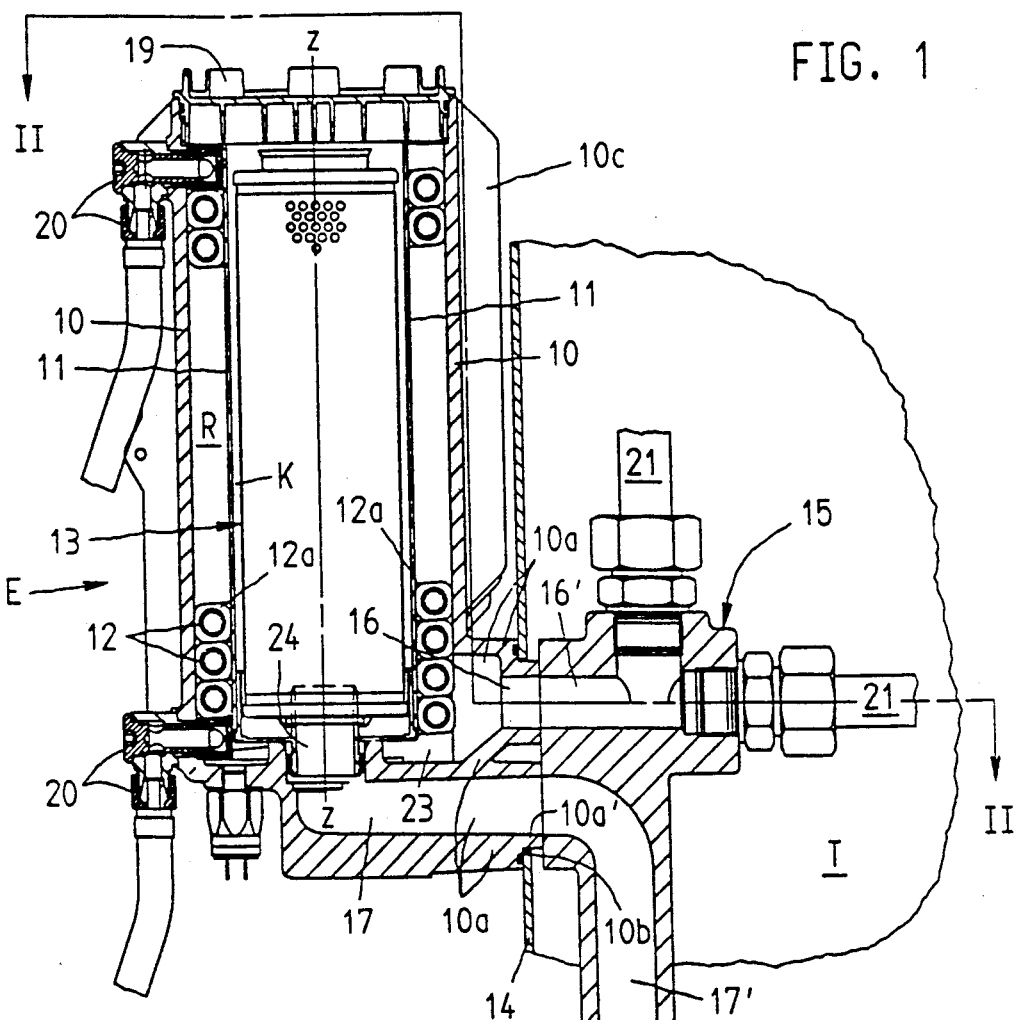
FIG. 1 is a sectional view taken on line I—I in FIG. 2 and showing the apparatus when only a single cooler-filter unit and no manifold block is installed.
Figure 2:
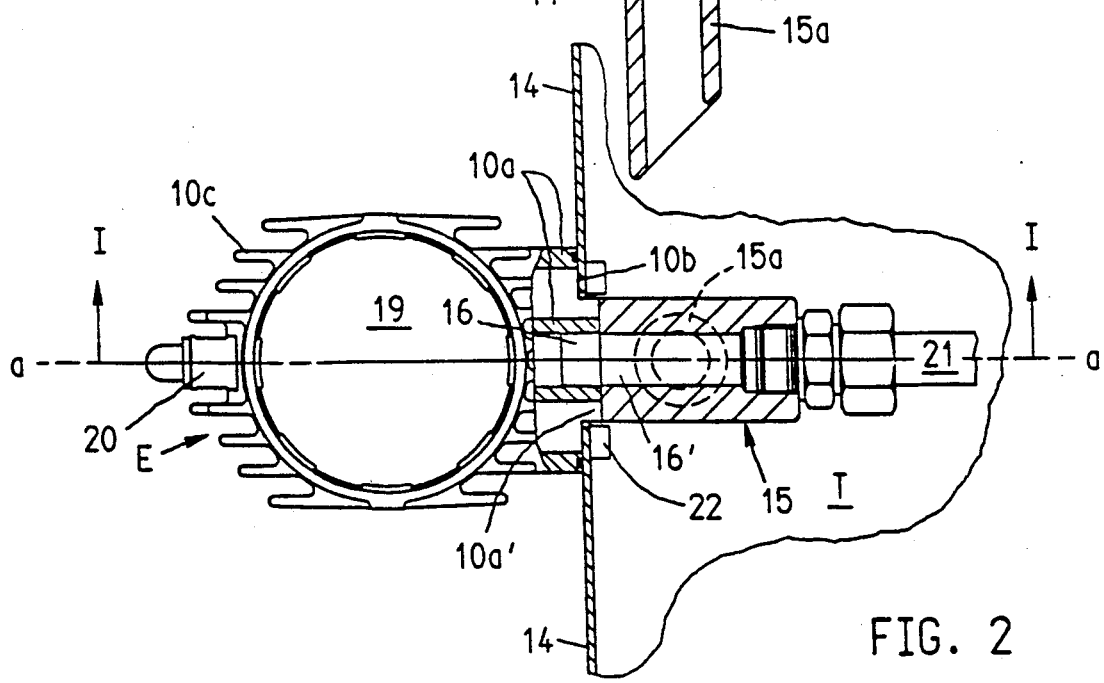
FIG. 2 is a sectional view taken on line II—II in FIG. 1.
Figure 3:
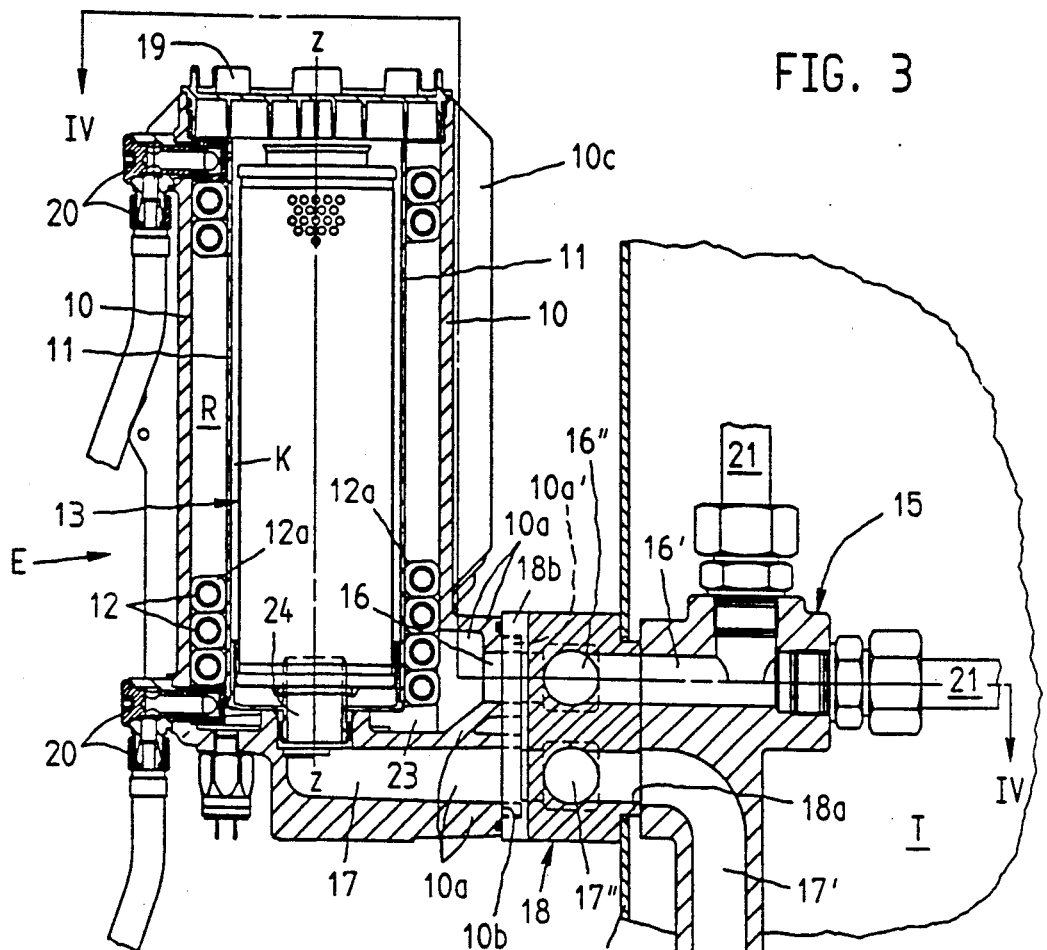
FIGS. 3 and 4 are views which are similar to FIGS. 1 and 2, respectively, and show the apparatus with two cooler-filter units and a manifold block installed.

Two illustrative embodiments of the invention will now be described more in detail with reference to the drawing.

The illustrated apparatus serves to water-cool the oil used in the hydraulic actuating system of an injection molding machine and to purify said oil by filtration. The apparatus comprises at least one cooler-filter unit of the type disclosed in U.S. Pat. No. 4,669,533. For an adaptation to different cooling demands, the apparatus can be assembled from components selected from respective sets thereof so that the cooling capacity of the apparatus satisfies a basic cooling demand or an integral multiple of said cooling demand. One of said sets of components consists of a plurality of cooler-filter units E, each of which has a cooling capacity for satisfying the basic cooling demand and is provided with a port member 10a, a set of mounting blocks 15, which are adapted to be mounted inside the oil reservoir T of the injection molding machine, and a set of manifold blocks 18, each of which is adapted to be connected between the port members of two or more cooler-filter units E and at least one mounting block 15 disposed in the reservoir T. The manifold blocks T are intended and adapted to interconnect supply passage sections 16 of the port members 10a to the supply passage section 16' of a mounting block 15 by means of a transverse supply passage section 16" and to connect return passage sections 17 of the port members 10a to a return passage section 17' of the mounting block 15 by means of a transverse return passage section 17". The manifold blocks will be described more in detail hereinafter.

Figure 4:
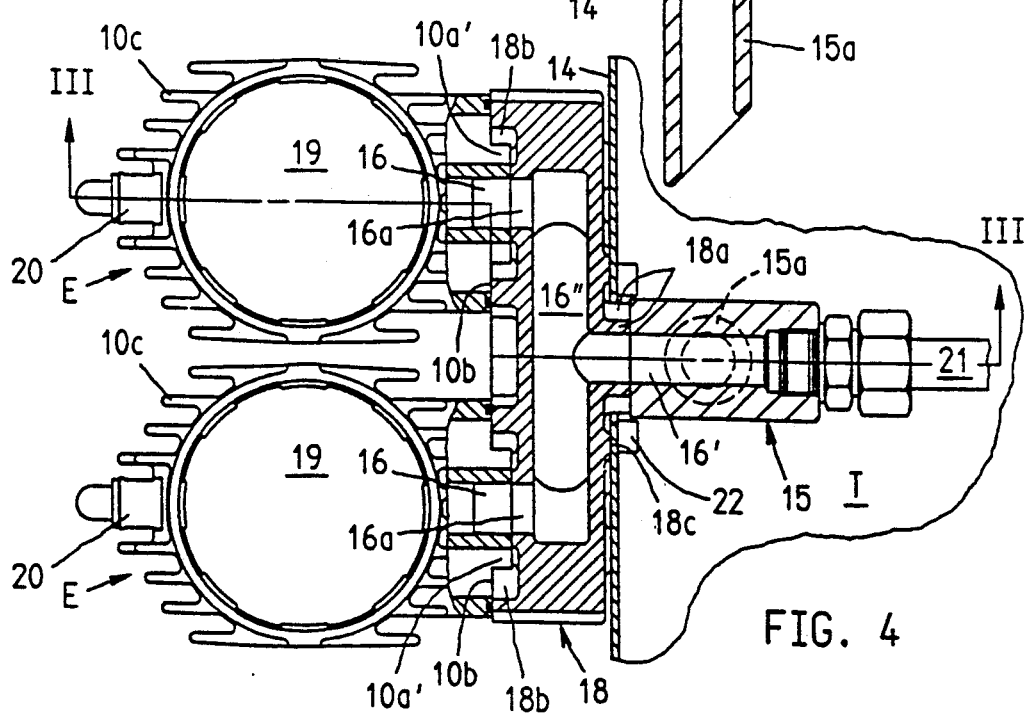
Figure 5:
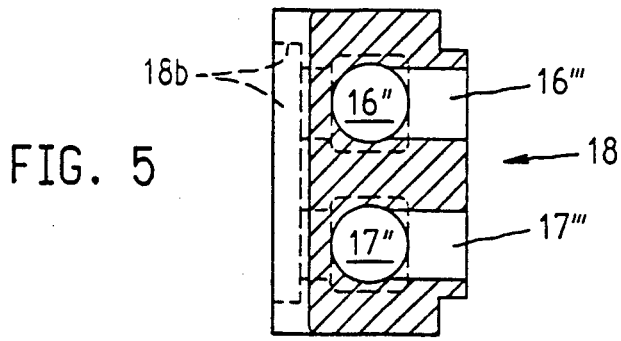
FIG. 5 is a sectional view taken on line V—V in FIG. 6.
Figure 6:
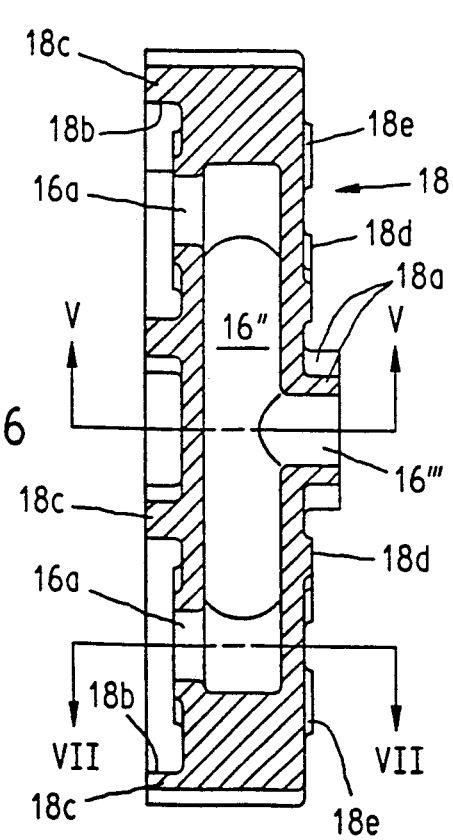
FIG. 6 is a sectional view taken on line VI—VI in FIG. 8 and showing a manifold block.
Figure 8:
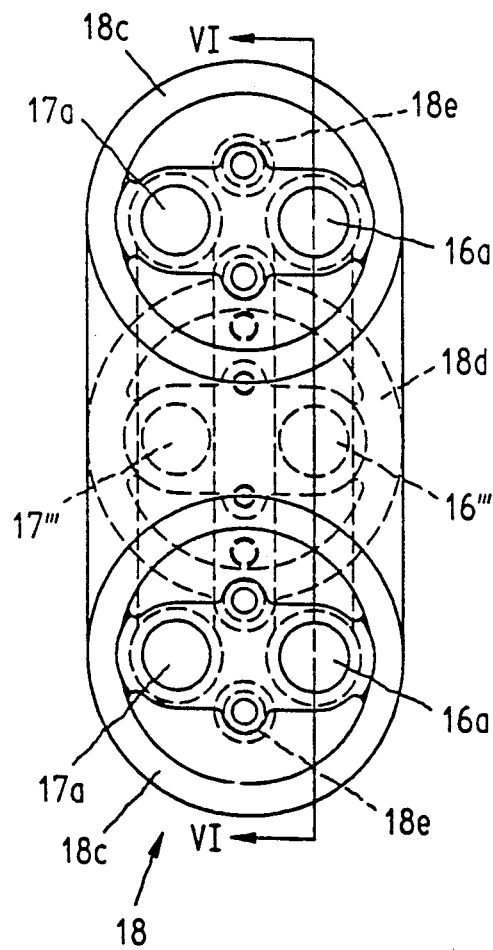
FIG. 8 shows the same manifold block as FIG. 6 after it has been turned through 90°.
Figure 7:
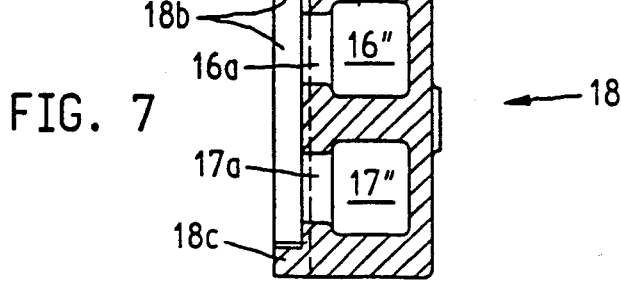
FIG. 7 is a sectional view taken on line VII—VII of FIG. 6.

Because the cooler-filter unit E as such is known from U.S. Pat. No. 4,669,533, it will be sufficient hereinafter to refer to the basic structural features of said unit as recited in the prior art part of claim 1. The cooler-filter unit comprises two coaxial oil-conducting pipes 10, 11. The first annular space R between the two oil-conducting pipes 10, 11 contains a helical cooling pipe 12, which consists of metal and on its outside surface is integrally formed with a helical cooling flange 12a for increasing the heat transfer. The inner oil-conducting pipe 11 of the cooler-filter unit E surrounds a filter insert 13, which together with the inner oil-conducting pipe 11 defines a second annular space K. The outer oil-conducting pipe is connected to a port member 10a, which has a centering outer end portion 10a'. The outer oil-conducting pipe 10 constitutes a housing of the cooler-filter unit and is provided with cooling fins 10a. The port member 10a is part of means for mounting the apparatus on a wall 14, which defines an oil reservoir T of the injection molding machine. Said means comprise also a mounting block 15, which is disposed in the reservoir T. The mounting block 15 is connected by fasteners 22 to the port member or members of one or more cooler-filter units provided on the outside of the wall 14. Each of the components consisting of the port member 10a and the mounting block 15 comprises two coaxial passage sections 16, 17; 16', 17', which are included in a supply passage 16, 16' and a return passage 17, 17' for the oil. The cooling water is supplied via the port 20 to the cooling pipe 12 and leaves the cooling pipe 12 via another port 20. The oil to be cooled flows through a supply line 21 into the supply passage section 16' of the mounting block 15 and either indirectly through the manifold block 18 or directly into the supply passage section 16 of the port member 10a. The supply passage section 16 leads into an annular space 23 below the cooling pipe 12 and the annular space 23 communicates with the first annular space R. The oil is forced upwardly through the spaces left between the confronting surfaces of the oil-conducting pipes 10, 11 and the outside surfaces of the cooling pipe and the cooling flange and when it has been subjected to a countercurrent cooling enters the second annular space K, in which the oil is distributed around the entire outside peripheral surface of the filter cartridge 21. The oil enters the interior of the filter cartridge 21 through the perforate cylindrical wall thereof and is filtered as it flows through said wall. From the interior of the filter cartridge 21 the oil flows through an outlet port into the return passage section 17 of the port member 10a. From the latter, the oil which has been cooled and purified flows indirectly through the manifold block 18 or directly into the return passage section 17' of the mounting block 15 and then through the return port 15a into the oil reservoir. In the illustrative embodiment shown the manifold block 18 is designed for connection to two cooler-filter units E and for this reason has bilateral symmetry, as is particularly apparent from FIG. 4. The transverse supply passage section 16" connects the two supply passage sections 16 of the port members 10a and communicates with the supply passage section 16' of a single mounting block 15. The manifold block 18 has a single centering inner end portion 18a, which extends into an annular recess formed in the wall 14 and is identical to the centering inner end portion 10a' of the port member 10a of each cooler-filter unit E. The manifold block 18 has annular centering shoulders 18b, which are equal in number to the cooler-filter units E and serve to receive and center the centering inner end portions 10a' of respective port members 10a. In the illustrated embodiment the two cooler-filter units E can be supported by means of annular abutment surfaces 10b on the wall 14 or on respective annular abutment surfaces 18c of the manifold block 18. The latter has an annular abutment surface 18d, which abuts the wall 14 so as to support the apparatus. The horizontal transverse supply passage section 16" of the manifold block 18 and the transverse return passage section 17" which extends in the manifold block below the transverse passage section 16" communicate through respective inner passage sections 16a, 17a with the passage sections 16, 17 of each port member 10a. Each of the inner passage sections 16a, 17a has a length which corresponds to the depth of the centering shoulders 18b. Each of the passage sections consisting of the transverse supply passage section 16" and the transverse return passage section 17" communicates through a single outer passage section 16"' or 17"' with the corresponding one of the passage sections 16' and 17' of the mounting block 15. As is particularly apparent from FIGS. 5 to 8, each of the passage sections consisting of the transverse supply passage section 16" and the transverse return passage section 17" has an intermediate portion, which is circular in cross-section, and mutually opposite end portions, which are square in cross-section. When the filter cartridge 13 has a vertical axis z—z of symmetry, the supply passage sections 16, 16' and the return passage sections 17, 17' are at right angles to the wall 14 defining the reservoir T and to the transverse supply and return passage sections 16"; 17". The outer oil-conducting pipe 10 serves as a housing of the cooler-filter unit and is provided with cooling fins 10c and with port members 10a and consists of a diecasting made of aluminum. The manifold block 18 consists also of a pressure diecasting made of aluminum. The mounting member 15 provided with the return port 15a consists of a grey cast iron.

As is apparent from FIGS. 1 to 4, the abutment surfaces of the port members 10a are provided with sealing rings.

What is claimed:

1. In an apparatus for water-cooling and filtering oil for use in a hydraulic system for actuating an injection molding machine having a wall having an inside surface which defines an oil reservoir, which apparatus comprises a cooler-filter unit having an inner oil-conducting pipe, an outer oil-conducting pipe coaxially surrounding and defining with said inner oil-conducting pipe a first annular space, a cooling pipe extending in said first annular space, a filter cartridge extending in and defining with said inner oil-conducting pipe a second annular space communicating with said first annular space in series therewith, a port member, which is mounted on said outer oil-conducting pipe and has a centering outer end portion protruding from said unit, a mounting block adapted to be disposed in said reservoir and to be mounted on the inside of said wall and to interengage with said centering outer end portion of said port member, wherein said port member and said mounting block are formed each with a supply passage section and with a return passage section and said supply passage sections are included in a supply passage communicating with one of said annular spaces in series therewith and are adapted to be coaxially interconnected and said return passage sections are included in a return passage communicating with the other of said annular spaces and are adapted to be coaxially interconnected, the improvement residing in that said apparatus comprises at least two of said cooler-filter units and said apparatus comprises a manifold block, which is interposed between and detachably connected to said mounting block and to said outer end portions of said port members of said cooler-filter units and has at least one outer supply passage section coaxially connected to said supply passage section of said mounting block, an outer return passage section coaxially connected to said return passage section of said mounting block, a plurality of inner supply passage sections coaxially connected to respective supply passage sections of said port members of said units, a plurality of inner return passage sections coaxially connected to respective return passage sections of said port members of said units, a transverse supply passage section interconnecting said inner and outer supply passage sections, and a transverse return passage section interconnecting said inner and outer return passage sections.

2. The improvement set forth in claim 1 as applied to an apparatus in which in each of said cooler-filter units said first annular space has an inlet end connected to said supply passage and said second annular space communicates through said filter cartridge with said return passage.

3. The improvement set forth in claim 1, wherein a plurality of said mounting blocks are provided and said manifold block has a plurality of said outer supply passage sections, each of which is coaxially connected to said supply passage section of one of said mounting blocks and to said transverse supply passage section.

4. The improvement set forth in claim 1, wherein said manifold block has a centering inner end portion which is identical to said centering inner end portion of each of said cooler-filter units.

5. The improvement set forth in claim 1, wherein said manifold block has a plurality of annular shoulders, and said centering outer end portion of each of said port members is received and centered by one of said centering shoulders.

6. The improvement set forth in claim 1, wherein said manifold block is formed with an inner annular abutment surface for engaging said wall and with a plurality of outer annular abutment surfaces facing said port members of said cooler-filter units, and said port member of each of said cooler-filter units has an annular abutment surface engaging one of said abutment surfaces of said manifold block and adapted to engage said wall.

7. The improvement set forth in claim 1, wherein each of said transverse passage sections has an intermediate portion which is circular in cross-section and mutually opposite end portions which are square in cross-section.

8. The improvement set forth in claim 1, wherein said cooler-filter units are identical to each other.

9. A kit of components for use in an apparatus for water-cooling and filtering oil for use in a hydraulic system for actuating an injection molding machine having a wall having an inside surface which defines an oil reservoir, which apparatus comprises a cooler-filter unit having an inner oil-conducting pipe, an outer oil-conducting pipe coaxially surrounding and defining with said inner oil-conducting pipe a first annular space, a cooling pipe extending in said first annular space, a filter cartridge extending in and defining with said inner oil-conducting pipe a second annular space communicating with said first annular space in series therewith, a port member, which is mounted on said outer oil-conducting pipe and has a centering outer end portion protruding from said unit, a mounting block adapted to be disposed in said reservoir and to be mounted on the inside of said wall and to interengage with said centering outer end portion of said port member, wherein said port member and said mounting block are formed each with a supply passage section and with a return passage section and said supply passage sections are included in a supply passage communicating with one of said annular spaces in series therewith and are adapted to be coaxially interconnected and said return passage sections are included in a return passage communicating with the other of said annular spaces and are adapted to be coaxially interconnected, which kit comprises at least two of said cooler-filter units, at least one of said mounting blocks, and at least one manifold block, which is adapted to be interposed between and detachably connected to said mounting block and to said outer end portions of said port members of said cooler-filter units and has at least one outer supply passage section and is adapted to be coaxially connected to said supply passage section of said mounting block, an outer return passage section adapted to be coaxially connected to said return passage section of said mounting block, a plurality of inner supply passage sections adapted to be coaxially connected to respective supply passage sections of said port members of said units, a plurality of inner return passage sections adapted to be coaxially connected to respective return passage sections of said port members of said units, a transverse supply passage section interconnecting said inner and outer supply passage sections, and a transverse return passage section interconnecting said inner and outer return passage sections.

10. A kit as set forth in claim 9, which comprises
three of said cooler-filter units and
two of said manifold blocks, wherein
one of said manifold blocks has two of said inner supply passage sections and two of said inner return passage sections and
the other of said manifold blocks has three of said inner supply passage sections and three of said inner return passage sections.

11. A kit as set forth in claim 9, wherein said cooler-filter units are identical to each other.

12. A kit as set forth in claim 9, which comprises
a plurality of said mounting blocks, each of which is adapted to be connected to one of said manifold blocks.

* * * * *